(12) United States Patent
Mizuno

(10) Patent No.: US 6,617,380 B2
(45) Date of Patent: Sep. 9, 2003

(54) RUBBER COMPOSITION FOR BREAKER CUSHION

(75) Inventor: Yoichi Mizuno, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/987,186

(22) Filed: Nov. 13, 2001

(65) Prior Publication Data

US 2002/0088521 A1 Jul. 11, 2002

(30) Foreign Application Priority Data

Nov. 13, 2000 (JP) ........................ 2000-345386

(51) Int. Cl.[7] ............... C08K 5/34; C08K 3/00
(52) U.S. Cl. ........................ 524/105; 524/424
(58) Field of Search ................. 524/105, 424

(56) References Cited

U.S. PATENT DOCUMENTS 5,503,940 A    4/1996  Majumdar et al.
5,610,240 A  * 3/1997  Hogt et al. .............. 525/332.6

FOREIGN PATENT DOCUMENTS

| JP | A5-339422 | 12/1993 |
| JP | 5-339422 | 12/1993 |
| JP | A7-9811 | 1/1995 |
| JP | 7-9811 | 1/1995 |
| JP | 9-328574 | 12/1997 |
| JP | A9-328574 | 12/1997 |
| JP | A2000-103207 | 4/2000 |
| JP | 2000-103207 | 4/2000 |
| WO | WO95 34601 | 12/1995 |
| WO | WO01/92039 A1 | 12/2001 |

* cited by examiner

Primary Examiner—Kriellion A. Sanders
(74) Attorney, Agent, or Firm—Birch, Stewart, Kolash & Birch, LLP

(57) ABSTRACT

There is provided a rubber composition for breaker cushion excellent in elongation at break strength at break after aging with maintaining control stability, and a truck and bus tire using the rubber composition. A rubber composition for breaker cushion comprises 1,3-bis(citraconimidomethyl) benzene and 25 to 35 parts by weight of carbon black having a nitrogen adsorption specific surface area of 70 to 120 $cm^2/g$ based on 100 parts by weight of a rubber component.

5 Claims, 1 Drawing Sheet

RUBBER COMPOSITION FOR BREAKER CUSHION

BACKGROUND OF THE INVENTION

The present invention relates to a rubber composition for breaker cushion and a tire using the same. More specifically, the present invention relates to a rubber composition for breaker cushion whose lowering of tensile properties from heat build up is small, and a bus or truck tire using the same.

As shown in FIG. 1, a layer called breaker cushion 1 is disposed between edge part of a breaker 2 and a case (ply) 3. This breaker cushion has great influence on riding, durability and the like. Particularly, in case of using a bus or truck tire, temperature in edge part of a breaker rises remarkably, inducing heat aging to cause the edge rubber of the breaker to separate from steel cord, which means the breaker cushion part therearound inevitably receives huge heat history during running. Further, a breaker cushion rubber may be terribly hardened and broken down by external shock to the state of burst. Therefore, it is required that a breaker cushion rubber has small lowering of tensile properties from heat build up with enduring heavy load.

In this way, many performances are required for a breaker cushion rubber. Conventionally, ISAF or HAF grade carbon has been preferably mixed to a breaker cushion rubber compound from the following reason. That is, when high class carbon having a larger nitrogen adsorption specific surface area than SAF is used to improve steering stability and tensile properties, heat build up characteristic is increased. Besides, when low class carbon such as FEF is used to decrease heat build up characteristic, tensile properties are lowered.

Recently, on the other hand, prompt development of a breaker cushion rubber whose fatigue resistance is further improved compared to conventional breaker cushion rubbers is desired in accordance with development of duration and correction of tire life.

SUMMARY OF THE INVENTION

An object of the present invention is to provide a rubber composition for breaker cushion which has excellent elongation at break, strength at break, and the like after aging with maintaining steering stability, and a tire using the rubber composition for breaker cushion.

By adding 1,3-bis(citraconimidomethyl)benzene as an anti-reversion agent ("reversion" meaning reversion of vulcanization) to a conventional breaker cushion rubber compound, property changes, particularly lowering of properties, of a breaker cushion rubber after aging are inhibited in the present invention.

That is, the present invention relates to a rubber composition for breaker cushion comprising 1,3-bis (citraconimidomethyl)benzene and 25 to 35 parts by weight of carbon black having a nitrogen adsorption specific surface area of 70 to 120 cm²/g based on 100 parts by weight of a rubber component.

In the above rubber composition for breaker cushion, the amount of 1,3-bis(citraconimidomethyl)benzene is preferably 0.05 to 1.0 part by weight.

And the present invention relates to a tire comprising the above rubber compositions for breaker cushion.

DETAILED DESCRIPTION

Figure 1:
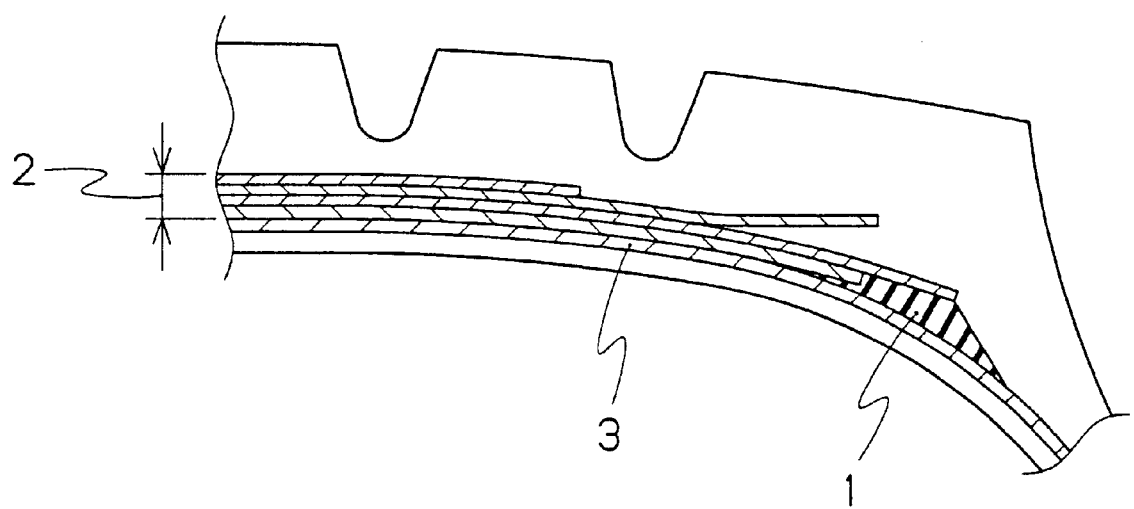
FIG. 1 is a cross-sectional view of a tread part of a conventional tire. Numeral 1 shows a breaker cushion, numeral 2 a breaker, and numeral 3 a case.

Japanese Unexamined Patent Publication No. 328574/1997 discloses that reversion and hardening of a rubber is prevented to improve cut resistance and the like by adding 0.1 to 1.2 parts by weight of 1,3-bis(citraconimidomethyl) benzene based on 100 parts by weight of a tread rubber (mainly base tread rubber). In such a process, silica is used together to prevent occurrence of chipping or tearing.

In the present invention, 1,3-bis(citraconimidomethyl) benzene is added to a breaker cushion rubber for which various properties are required.

According to the rubber composition for breaker cushion of the present invention, it is possible to prevent lowering of strength and elongation at break after aging or running to the minimum degree.

It is desired to mainly use a natural rubber and/or a polyisoprene rubber as a rubber component from the viewpoint of low heat build up characteristic. Other useful rubber components include a butadiene rubber, a styrene-butadiene rubber and the like.

The total amount of a natural rubber and a polyisoprene rubber is preferably 90 to 100% by weight, more preferably 100% by weight in a rubber component. When the total amount is less than 90% by weight, there are tendencies that heat build up characteristic increases and that properties after aging are lowered.

In the present invention, carbon black is used as a reinforcing agent. Carbon black whose nitrogen adsorption specific surface area ($N_2SA$) is 70 to 120 m²/g, preferably 90 to 110 m²/g is used. When the nitrogen adsorption specific surface area is less than 70 m²/g, reinforcing ability and rigidity (steering stability) are insufficient. When it is more than 120 m²/g, heat build up characteristic increases.

The amount of carbon black is 25 to 35 parts by weight, preferably 28 to 32 parts by weight based on 100 parts by weight of a rubber component. When the amount of carbon black is less than 25 parts by weight, reinforcing ability and rigidity is insufficient. When the amount is more than 35 parts by weight, heat build up characteristic is high and elongation at break is lowered.

It is possible to prevent reversion during not only running but also vulcanization by mixing 1,3-bis (citraconimidomethyl)benzene to a rubber composition for breaker cushion as an antireversion agent according to the rubber composition for breaker cushion of the present invention.

On receiving heat history, rubber usually hardens due to break of sulfur chain and subsequent development of re-bond and re-crosslinking, and mechanical properties thereof are remarkably lowered. However, in the rubber composition for breaker cushion of the present invention, 1,3-bis(citraconimidomethyl)benzene enables bonding which is more heat-resistant than and as flexible as sulfur bond due to Diels-Alder reaction.

The amount of 1,3-bis(citraconimidomethyl)benzene is preferably 0.05 to 1.0 part by weight, preferably 0.1 to 0.5 part by weight based on 100 parts by weight of a rubber component. When the amount is less than 0.05 part by weight, the above effect is small. When the amount is more than 1.0 part by weight, the above effect can not be enhanced significantly but costs tend to increase.

In addition to the above rubber components, carbon black and 1,3-bis(citraconimidomethyl)benzene, it is possible to add additives such as an antioxidant, zinc oxide and stearic acid, vulcanization agents such as sulfur, and vulcanization accelerators, which are commonly used for rubber products, to the rubber composition for breaker cushion of the present invention without particular limitation.

The rubber composition for breaker cushion of the present invention is obtained by kneading the above rubber component, carbon black and 1,3-bis(citraconimidomethyl)benzene preferably at 100° to 180° C., more preferably at 120° to 160° C. When the kneading temperature is lower than 100° C., 1,3-bis(citraconimidomethyl)benzene tends to be insoluble in the rubber. When the kneading temperature is higher than 180° C., the rubber material tends to become bad.

The rubber composition for breaker cushion of the present invention is vulcanized after molding and used as breaker cushion, for example, in a bus or truck tire. Vulcanization is carried out under pressure of 20 to 30 kgf preferably at 130° to 160° C., more preferably at 140° to 150° C. for 30 to 40 minutes. When the vulcanization temperature is lower than 130° C., vulcanization slows down remarkably. When the vulcanization temperature is higher than 160° C., reversion tends to occur at other parts constituting the tire.

The present invention is explained in detail based on Examples below, but the present invention is not limited thereto.

Examples 1 to 11 and Comparative Examples 1 to 5

Reagent

Carbon black 1: DIABLACK LI N219 ($N_2SA$ 110 $m^2/g$) available from Mitsubishi Chemical Corporation Carbon black 2: Seast N N330 (NSA 74 $m^2/g$) available from Tokai Carbon Co., Ltd.

Carbon black 3: Seast 9 N110 (NSA 142 $m^2/g$) available from Tokai Carbon Co., Ltd.

Carbon black 4: SHOBLACK N550 (NSA 42 $m^2/g$) available from Showa Cabot Co. Ltd.

1,3-bis(citraconimidomethyl)benzene: Perkalink 900 available from FLEXSYS CO.

Antioxidant: Nonflex RD available from Seiko Chemicals Co., Ltd.

Stearic acid: KIRI available from NOF Corporation

Zinc White: Ginrei R available from Toho Zinc Co. Ltd.

Sulfur: sulfur available from Tsurumi Chemicals Co., Ltd.

Vulcanization accelerator: Nocceler NS (N-tert-butyl-2-benzothiazolylsulfenamide) available from Ohuchi Shinko Kagaku Kogyo Co. Ltd.

Preparation Method

The basic compound shown in Table 2 and each of the compounds shown in Table 1 were compounded except for sulfur and the vulcanization accelerator. The obtained compound was kneaded by using a Banbury mixer at about 150° C. for five minutes. Next, sulfur and the vulcanization accelerator were added to the obtained rubber composition, and the mixture was kneaded at about 80° C. for five minutes by using a twin-screw open roll.

The thus-obtained rubber composition was molded into breaker cushion and vulcanization was carried out at 150° C. for 30 minutes under a pressure of 20 kgf to prepare a truck tire having a size of 11R22.5.

Test Method (1) Loss tangent (Viscoelasticity)

Test pieces were prepared from the breaker cushion rubber of the produced new tire. Loss tangent (tan δ) thereof at 60° C. was measured by using a viscoelastometer made by Iwamoto Corporation under the condition that frequency is 10 MHz and dynamic strain is 1.0%. The smaller the value, the lower the tan δ is. In this case, heat build up characteristic is excellently low and rolling resistance is superior.

(2) Hardness (JIS-A)

Test pieces were prepared from the breaker cushion rubber of the produced new tire and hardness thereof was measured by using a JIS-A hardness scale at 25° C.

(3) Road Test

The produced tire was mounted on a 10 ton truck and comparison of appearance was made after the truck was run for 200,000 km. The tire was destructured in section and visually observed whether any crack was generated in the breaker cushion rubber or not.

○ means that there is no problem with appearance and no crack is generated in the breaker cushion part.

Δ means that though there is no problem with appearance, some small cracks are observed in the breaker cushion part.

x means that the tire is swollen in appearance, indicating cracks are generated in the breaker cushion part.

(4) Tensile Test

Tensile test for the breaker cushion rubber of the produced new tire was carried out by using a No. 3 dumbbell in accordance with JIS-K6252 to measure strength at break $T_B$ (MPa) and elongation at break $E_B$ (%). The same test was carried out for the above tire after the road test. Retention was calculated by using the obtained measured values according to the following equation. The larger the retention, the smaller the lowering of the tensile properties is.

Retention=Measured value after road test÷Measured value of new tire×100

Test Results

The results are shown in Table 1.

(1) Examples 1 to 6 and Comparative Example 1 show that tensile properties after aging are improved when 1,3-bis(citraconimidomethyl)benzene is added. Tensile properties were improved in accordance with increase of the amount in the range of 0.05 to 0.7 part by weight, but were not improved when the amount exceeded 1 part by weight.

(2) Examples 2 and 10 and Comparative Examples 4 and 5 show that heat build up characteristic is increased when carbon black 3 (N110) having a large nitrogen adsorption surface area is used. On the other hand, rigidity is insufficient, steering stability is inferior and tensile properties are lowered when carbon black 4 (N550) having a small nitrogen adsorption surface area is used.

(3) Examples 2, 7 and 8 and Comparative Examples 2 and 3 show that the amount of carbon is preferably 25 to 35 parts by weight. When the amount was less than 25 parts by weight, rigidity was low, steering stability was inferior and breaking strength was small. When the amount was more than 35 parts by weight, heat build up characteristic was high and breaking elongation was lowered.

TABLE 1

| Compound (part) | Ex. No. 1 | 2 | 3 | 4 | 5 | 6 | 7 | 8 | 9 | 10 | 11 | Comp. Ex. No. 1 | 2 | 3 | 4 | 5 |
|---|---|---|---|---|---|---|---|---|---|---|---|---|---|---|---|---|
| NR | 100 | 100 | 100 | 100 | 100 | 100 | 100 | 100 | 100 | 100 | 100 | 100 | 100 | 100 | 100 | 100 |
| Carbon black 1 (N219) | 30 | 30 | 30 | 30 | 30 | 30 | 25 | 35 | — | — | — | 30 | 20 | 40 | — | — |
| Carbon black 2 (N330) | — | — | — | — | — | — | — | — | 25 | 30 | 35 | — | — | — | — | — |
| Carbon black 3 (N110) | — | — | — | — | — | — | — | — | — | — | — | — | — | — | 30 | — |
| Carbon black 4 (N550) | — | — | — | — | — | — | — | — | — | — | — | — | — | — | — | 30 |
| 1,3-bis(citraconimidemethyl)benzen | 0.05 | 0.2 | 0.5 | 0.7 | 1 | 1.2 | 0.2 | 0.2 | 0.2 | 0.2 | 0.2 | 0 | 0.2 | 0.2 | 0.2 | 0.2 |
| Test results |  |  |  |  |  |  |  |  |  |  |  |  |  |  |  |  |
| (1) Loss tangent | 0.049 | 0.049 | 0.048 | 0.047 | 0.047 | 0.045 | 0.043 | 0.053 | 0.034 | 0.041 | 0.049 | 0.050 | 0.039 | 0.063 | 0.061 | 0.040 |
| (2) Hardness | 56 | 56 | 57 | 57 | 57 | 58 | 54 | 58 | 53 | 54 | 57 | 56 | 52 | 61 | 60 | 49 |
| (3) Appearance Destruction | ○ | ○ | ○ | ○ | ○ | ○ | ○ | ○ | ○ | ○ | ○ | ○ | Δ | Δ | Δ | X |
| (4) Tensile properties $T_B$ (MPa) |  |  |  |  |  |  |  |  |  |  |  |  |  |  |  |  |
| New tire | 27 | 26 | 27 | 26 | 28 | 28 | 23 | 31 | 20 | 25 | 27 | 27 | 22 | 23 | 32 | 20 |
| After road test | 21 | 21 | 22 | 21 | 22 | 22 | 19 | 26 | 17 | 21 | 23 | 21 | 17 | 19 | 24 | 15 |
| Retention | 78 | 81 | 81 | 81 | 79 | 79 | 83 | 84 | 85 | 84 | 85 | 78 | 77 | 83 | 75 | 75 |
| $E_B$ (%) |  |  |  |  |  |  |  |  |  |  |  |  |  |  |  |  |
| New tire | 525 | 535 | 535 | 530 | 530 | 530 | 545 | 515 | 495 | 475 | 455 | 530 | 570 | 505 | 490 | 440 |
| After road test | 420 | 445 | 450 | 445 | 430 | 425 | 460 | 430 | 420 | 410 | 400 | 400 | 485 | 390 | 385 | 375 |
| Retention | 80 | 83 | 84 | 84 | 81 | 80 | 84 | 83 | 85 | 86 | 88 | 75 | 85 | 77 | 79 | 85 |

TABLE 2

| Basic compound | Part(s) by weight |
|---|---|
| Antioxidant | 2 |
| Stearic acid | 3 |
| Zinc oxide | 4 |
| Sulfur | 2 |
| Vulcanization accelerator | 1 |

In the present invention, 1,3-bis(citraconimidomethyl)benzene is added to a rubber composition for breaker cushion as an antireversion agent. According to this, reversion during not only running but also vulcanization is prevented, lowering of tensile properties is prevented and steering stability becomes excellent.

What is claimed is:

1. A rubber composition for breaker cushion comprising 1,3-bis(citraconimidomethyl)benzene and 25 to 35 parts by weight of carbon black having a nitrogen adsorption specific surface area of 70 to 120 $cm^2/g$ based on 100 parts by weight of a rubber component.

2. The rubber composition for breaker cushion of claim 1, wherein the amount of 1,3-bis(citraconimidomethyl) benzene is 0.05 to 1.0 parts by weight based on 100 parts by weight of the rubber component.

3. A tire comprising the rubber composition for breaker cushion of claim 1.

4. The rubber composition for breaker cushion of claim 1, wherein the amount of carbon black is 28 to 32 parts by weight based on 100 parts by weight of the rubber component.

5. The rubber composition for breaker cushion of claim 1, wherein the amount of 1,3-bis(citraconimidomethyl) benzene is 0.1 to 0.5 parts by weight based on 100 parts by weight of the rubber component.

* * * * *